Nov. 15, 1932.     R. E. CHAPMAN     1,888,026

BALANCED JOINT

Original Filed March 19, 1925

Inventor
Ralph E. Chapman
By his Attorneys
Emery Booth Janney & Varney

Patented Nov. 15, 1932

1,888,026

UNITED STATES PATENT OFFICE

RALPH E. CHAPMAN, OF BROOKLYN, NEW YORK

BALANCED JOINT

Application filed March 19, 1925, Serial No. 16,598. Renewed April 9, 1932.

The present invention relates to couplings or joints and more particularly to couplings or joints connecting hollow members in a manner to permit relative movement.

When there is a difference between the external and internal pressures at the joint there is ordinarily a force tending to force the members together or apart or tending to lock the sections frictionally against movement. This pressure or force may considerably increase the friction of the joint and prevent free relative movement of the parts. When the difference in pressure is excessive or when special freedom of movement is desired this friction of the joint becomes seriously objectionable.

It is the object of the prevent invention to provide an improved joint having means for reducing the friction and increasing the freedom of movement. The nature and objects of the invention will be better understood from a specific description of a particular illustrative embodiment thereof, for the purposes of which description reference should be had to the accompanying drawing forming a part hereof, wherein Figure 1 is a longitudinal sectional view of a spherical joint embodying certain principles of the invention.

Figure 2:
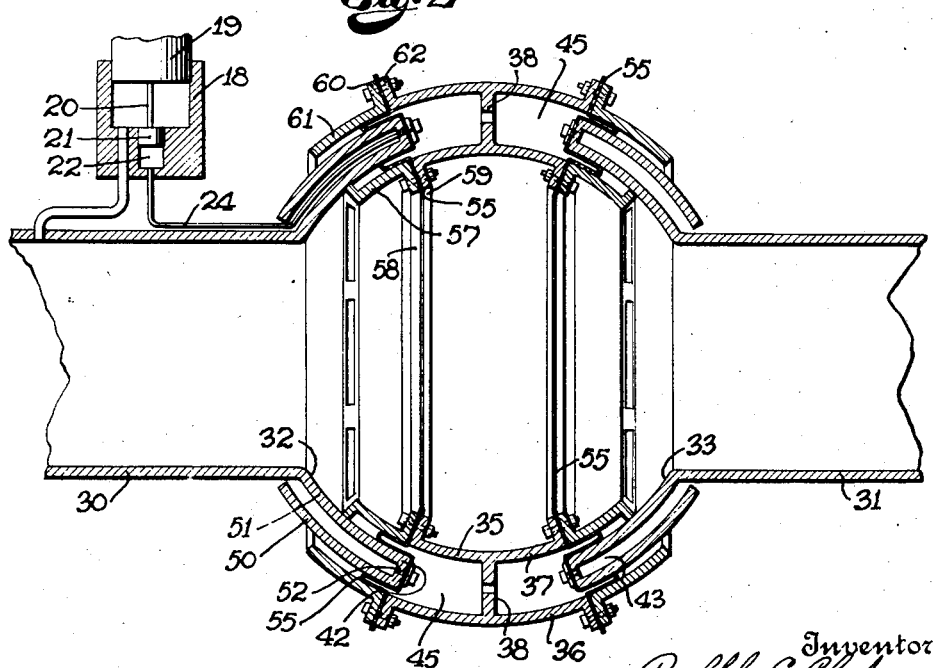

Figure 2 is a longitudinal sectional view of another form of joint embodying certain principles of the invention.

Figure 1:
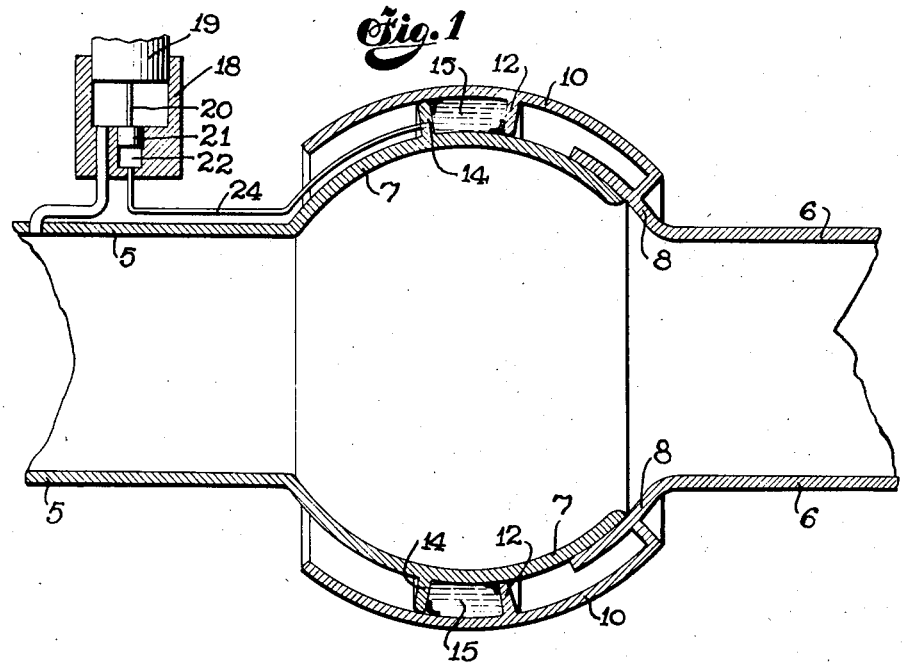

The joint shown in Figure 1 for the purposes of illustration comprises sections 5 and 6 having interengaging spherical ends 7 and 8, respectively, which provide in effect a ball and socket joint.

When the external and internal pressures are different a force will be set up tending to force the sections of the joint longitudinally with respect to each other and tending to cause a binding of the joint, which force will be substantially equal to the different in pressures multiplied by the cross sectional area. This force can be counter-balanced by means engaging the two sections and acting in the opposite direction. A conveniently provided means comprises a pressure chamber having opposed elements, secured to the respective sections and means for maintaining a suitable pressure within the chamber.

The pressure chamber may be so arranged and of such a size that the force due to the difference between the external and internal pressures is substantially balanced if the pressure chamber is connected to maintain therein a pressure equal to the external pressure or the internal pressure, depending upon the particular arrangement and the conditions of use of the joint. Such an arrangement, however, ordinarily requires a pressure chamber having pressure heads, the area of which is substantially equal to the cross sectional area of the interior of the joint thus providing an objectionably large and cumbersome construction. In the structure under consideration the pressure chamber is made relatively small and means is provided for maintaining therein fluid under a sufficient pressure to cause the necessary balancing force to be applied. The construction and arrangement of the pressure chamber will depend upon the requirements of the particular apparatus. The joint shown in Figure 1 is designed for use where the external pressure is greater than the internal pressure and therein a housing 10 is provided concentric with the spherical ends 7 and 8 and rigidly connected to the spherical section 8. This housing has an inwardly directed flange 12 engaging the spherical section 7 and forming a fluid tight joint therewith. An opposed flange 14 extends outwardly from the spherical section 7 and engages the inner surface of the housing 10 forming also a fluid tight joint. This arrangement provides a pressure chamber 15 so positioned that pressure therein operating against the flanges 12 and 14 as opposed heads acts in opposition to the force normally due to the difference between the external and internal pressures at the joint.

Any suitable arrangement may be provided for maintaining a suitable pressure within this pressure chamber. The degree of pressure maintained, whether maintained by an independent pressure supplying device such as a pump, or by means controlled by the external pressure or by the internal pressure or by both, should be such that the ratio of the pressure in the chamber to the difference between the internal and external pressure will be substantially the inverse of the ratio of the effective cross-sectional area of the chamber to the effective cross-sectional area of the joint or at least the conditions as to pressure should be such that a condition of balance of forces is approached.

The arrangement illustrated herein for maintaining pressure within the pressure chamber is such that the pressure automatically varies as the external and internal pressures vary, that is to say the pressure within the chamber is a function of the external pressure and a function of the internal pressure, or it may be defined as a function of the difference between the external and internal pressures.

As shown in Figure 1, a hydraulic pressure device is provided consisting of a cylinder 18 in which moves a piston 19. The inner end of the cylinder is connected to the interior of one of the joint sections 5 to receive the internal pressure and the outer end of the cylinder is connected to receive the external pressure. A piston rod 20 is connected with a small piston 21 operating in a cylinder 22, and a pipe 24 connects this cylinder with the interior of the pressure chamber 15. The pressure in the chamber 15 thus varies with the external and internal pressures and depends thereon. The pressure may be computed as equal to the difference between the external and internal pressures multiplied by the ratio between the area of the piston 19 and the area of the piston 21. In the arrangement shown it is contemplated that the joint will be used under such conditions that the external pressure will be greater than the internal pressure and therefore the pressure within the chamber 15 will be greater than the external or internal pressures. If, as a matter of fact, the pressure within the joint was greater than the external pressure, then a suction would be created and a relatively negative pressure would be produced in the chamber 15.

Any suitable fluid may be provided in the pressure chamber and the connection shown. It is contemplated that oil or grease will be used in the particular joint illustrated.

The construction shown in Figure 2 is similar in principle to that shown in Figure 1. In this construction the sections 30 and 31 are similar and have similar spherical ends 32 and 33 which fit within an intermediate floating section 35 having outer and inner spherical walls 36 and 37 and a connecting web 38.

The sections 32 and 33 are provided with radial flanges or ends 42 and 43 which are arranged to form fluid tight joints with the spherical sections 36 and 37. The pressure chamber 45 is thus formed in the intermediate member 35, the wall 38 being perforated so that this chamber is not divided in fact. Pressure within this chamber acts against the flanges 42 and 43 to counteract or balance the effect of the pressure tending to move the sections longitudinally relative to each other. Obviously this arrangement is in some respects merely similar to the arrangement shown in Figure 1, but duplicated to provide a greater freedom of movement. It will be obvious that if the movement between each section 30, 31 and the intermediate section 35 is made as great as the movement between the sections 5 and 6 of Figure 1, then the angular movement between the sections 30, 31 is equivalent to twice the angular movement between the sections 5 and 6. Stated conversely, a given angular movement between sections 30, 31 can be provided with only one-half of the movement in each portion of the joint. The advantages of the arrangement shown because of this particular feature are of course obvious and require no further explanation.

The provision for maintaining a fluid tight joint as shown in the structure of Figure 2 differs from that shown in Figure 1 but obviously either arrangement could be adopted in either structure. In Figure 2 the spherical end 32 is shown as comprising outer and inner concentric walls 50, 51 which are connected by the flange or end 52.

The packing shown for maintaining a fluid tight joint between the end of section 30 and the intermediate section 35, consists of a flexible annular sheet 55 suitably secured to the end 52 of section 30 and to the inner and outer spherical walls of section 35. As shown, a continuous annular washer and stud bolts secure the middle of the sheet to the end wall 52. The outer and inner spherical walls of the intermediate section 35 are made in sections to facilitate assembly and the securing of the sheet at its outer and inner edges. The inner wall has an extension 57 flanged at its inner edge and the sheet 55 is clamped between the flange 58 of the extension and a cooperating flange 59. The outer edge of the sheet is similarly clamped between a flange 60 of the extension 61 and a cooperating flange 62. The joint between the intermediate section and the end section 31 is similar and need not be separately described.

If the arrangement is such that the weight or buoyancy acting upon one of the joint members affects the force tending to bind the joint, then obviously this should be considered in the design and arrangement of the balancing chamber and associated pressure devices.

The description of the particular illustrated structures is illustrative merely and is not intended as defining the limits of the invention.

I claim as my invention:

1. A coupling comprising two sections and means operative to set up a force opposing that force which tends to produce relative movement between the sections and which results from a difference between the external and internal pressures, said means comprising an expansible pressure chamber and means for maintaining a pressure in said chamber different from but dependent upon the pressure within the sections.

2. A coupling comprising two sections and means operative to set up a force opposing that force which tends to produce relative movement between the sections and which results from a difference between the external and internal pressures, said means comprising an expansible pressure chamber and means for maintaining a pressure in said chamber different from but dependent upon the difference between the external and internal pressures.

3. A coupling comprising two sections and means operative to set up a force opposing that force which tends to produce relative movement between the sections and which results from a difference between the external and internal pressures, said means comprising an expansible pressure chamber and means for maintaining a pressure in said chamber different from but dependent upon the external pressure.

4. A coupling comprising two sections and means to oppose a tendency of said sections to move longitudinally relative to each other because of a difference between the internal and external pressures comprising a fluid pressure device for applying a force to said sections and means for maintaining therein a pressure which is a function of the difference between the external and internal pressures.

5. A coupling comprising two sections and means to oppose a tendency of said sections to move longitudinally relative to each other because of a difference between the internal and external pressures comprising a fluid pressure device for applying a force to said sections and means for maintaining therein a pressure which is different from but dependent upon the external pressure.

6. A coupling comprising two sections and means to oppose a tendency of said sections to move longitudinally relative to each other because of a difference between the internal and external pressures comprising a fluid pressure device for applying a force to said sections and means for maintaining therein a pressure which is different from but dependent upon the internal pressure.

7. A coupling comprising two sections and means to oppose a tendency of said sections to move longitudinally relative to each other because of a difference between the internal and external pressures comprising a fluid pressure device for applying a force to said sections and means for maintaining therein a pressure which is equal to the difference between the external and internal pressures multiplied by a predetermined factor.

8. A coupling comprising two angularly adjustable sections, opposed heads connected one to each of said sections, and means for completing the enclosure of the space between the said heads but permitting relative movement therebetween, a hydraulic pressure device controlled by the external pressure connected to supply fluid under pressure to the space between said heads to counteract the forces on the coupling due to external and internal pressures.

9. A coupling comprising two sections connected for relative angular movement and means to oppose a tendency of said sections to lock together frictionally because of the difference between external and internal pressures, comprising a hydraulic device for multiplying pressure.

10. In a joint for submarine armor, in combination, two relatively movable sections having interengaging concentric ends slidably engaging each other to permit angular movement of the sections about a transverse axis, a pressure chamber associated with said ends and so arranged that pressure within said chamber acts in opposition to the difference in pressure between the interior and exterior of said members and a pump arranged to apply pressure within the pressure chamber, said pump comprising a piston subjected on one side to pressure equal to the pressure within the sections and on the other side to pressure equal to the pressure external to the sections.

11. A coupling comprising two abutting sections movable angularly with respect to each other and having interengaging concentric ends, the interengaging ends having projected surfaces whereby a difference in pressure between the exterior and interior thereof tends to move the members relatively in one direction, a pressure chamber associated with said ends and so arranged that pressure therein acts to oppose the force due to the aforesaid difference in pressure, and means actuated by the difference in pressure between the exterior and interior for controlling the pressure in said chamber.

12. A coupling of the character described comprising in combination interengaging concentric spherical members movable relative to each other, one member having telescopic engagement with a double walled spherical chamber and packing consisting of a flexible sheet rigidly secured in both the members but flexible to permit a rolling action of the packing between the two telescopic spherical members.

13. In a coupling comprising two sections which tend to be moved relatively due to the difference between external and internal pressures, the arrangement of means operative to set up a force opposing the relative movement comprising a pressure multiplying device having a large piston subjected on one side to the external pressure and on the other side to the internal pressure and a smaller piston actuated thereby.

14. A coupling of the character described comprising in combination interengaging telescoping members and a flexible packing member connected to both telescoping members and arranged to roll between said telescoping members in contact with both.

15. A coupling of the character described comprising in combination interengaging concentric members movable relative to each other, one member having outer and inner walls, the other member movable between said walls and a flexible member secured to said other member and to both walls of the first member to form a fluid tight packing between said members.

16. A coupling comprising two sections and means to oppose a tendency of said sections to lock together frictionally because of a difference between the internal and external pressures comprising a pair of opposed heads connected respectively to the ends of said sections and means for maintaining fluid between said heads under a pressure greater than but having a predetermined relation to the pressure within the said sections.

17. A coupling comprising two sections and means to oppose a tendency of said sections to lock together frictionally because of a difference between the internal and external pressures comprising a pair of opposed heads connected respectively to the ends of said sections and means for maintaining fluid between said heads under a pressure greater than but having a predetermined relation to the external pressure.

18. A coupling comprising two sections and means to oppose a tendency of said sections to lock together frictionally because of a difference between the internal and external pressures comprising a pair of opposed heads connected respectively to the ends of said sections and means for maintaining fluid between said heads under a pressure greater than but having a predetermined relation to the difference between the external and internal pressures.

19. A coupling comprising two sections and means to oppose a tendency of said sections to lock together frictionally because of a difference between the internal and external pressures comprising a pair of opposed heads, said heads being of an area less than but having a predetermined ratio to the cross sectional area of the sections, and means for maintaining between said heads a fluid pressure greater than but having a predetermined relation to the pressure within said sections.

20. A coupling comprising two sections, opposed heads connected one to each of said sections, and means for completing the enclosure of the space between said heads but permitting relative movement therebetween, a hydraulic pressure device controlled by the difference between the internal and external pressures connected to supply fluid under pressure to the space between said heads.

21. A coupling comprising two sections, opposed heads connected one to each of said sections, and means for completing the enclosure of the space between said heads but permitting relative movement therebetween, a hydraulic pressure device controlled by the internal pressure connected to supply fluid under pressure to the space between said heads.

22. A coupling comprising two sections connected for relative movement, a flange secured to the exterior of the first section, a second flange connected to the interior of the second section and engaging the exterior of the first section, and spaced from said first flange in the direction of said first section from said second section, means for completing the enclosure of the space between said flanges but permitting relative movement of said flanges, and a pump for supplying fluid under pressure to said space.

23. A coupling comprising two sections connected for relative movement, a flange secured to the exterior of the first section, a second flange connected to the interior of the second section and engaging the exterior of the first section, and spaced from said first flange in the direction of said first section from said second section, the area of said flanges being smaller than and bearing a predetermined ratio to the area of said sections and means for maintaining a pressure between said flanges bearing a ratio to the difference between the internal and external pressures, which is substantially the inverse of the ratio between the area of the flanges and of the sections.

24. A coupling comprising two abutting sections movable with respect to each other, a pair of opposed heads connecting the respective sections, means for completing the enclosure of the space between said heads but leaving the heads free to move from each other, the area of the heads being substantially different from the cross sectional area of the sections, and means for maintaining fluid between the heads under a pressure bearing such ratio to the difference between the external and internal pressures that the pressure between the heads will be substantially equal and in opposite direction to the pressure between the sections due to difference between external and internal pressures.

25. A coupling comprising two abutting sections movable angularly with respect to each other and having interengaging concentric ends slidably engaging each other to permit the angular movement of the sections about a transverse axis, a pair of opposed heads connected respectively to the ends, a housing concentric with the ends, spaced radially outward from the inner end, one of the opposing heads being secured to the housing and having a sliding bearing against the inner end and the other head being secured to the inner end and having a sliding bearing against the housing, the housing and the inner end cooperating to complete the enclosure of the space between said heads, and means for maintaining between said heads fluid under pressure, the area of the heads and the fluid pressure thereagainst being so proportioned that the internal and external pressures acting longitudinally of the coupling will be substantially equal.

26. An angularly adjustable coupling having an enlarged pressure surface subject to binding action of both external and internal pressures, and means to balance the pressures to prevent binding action, said means comprising pressure heads and a pressure chamber, and means for applying to said heads a balancing pressure.

In testimony whereof I have signed my name to this specification this 16th day of March, 1925.

RALPH E. CHAPMAN.